Jan. 2, 1968 A. W. FULLER 3,362,006
ELECTRICAL WIRING DEVICE HAVING A RESILIENT BODY
AND ANGULARLY ADJUSTABLE ANGLED CORD GRIP
Filed April 24, 1967 2 Sheets-Sheet 1
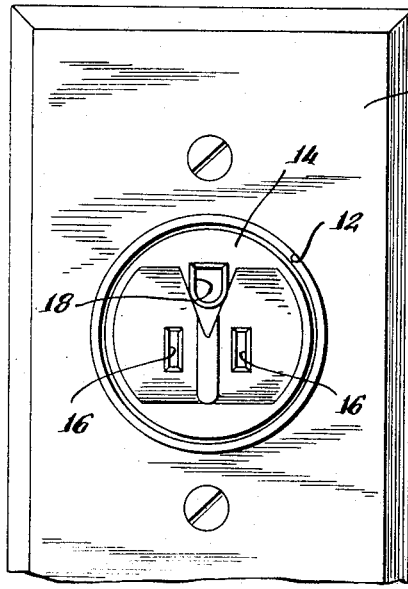
Fig. 1.
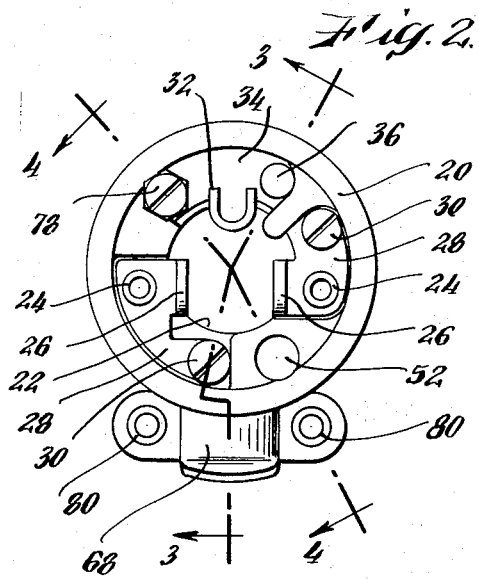
Fig. 2.
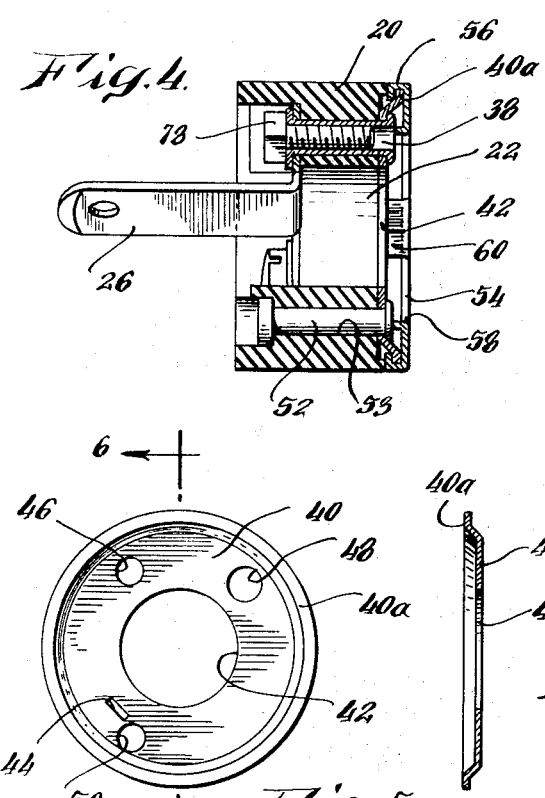
Fig. 4.
Fig. 5.
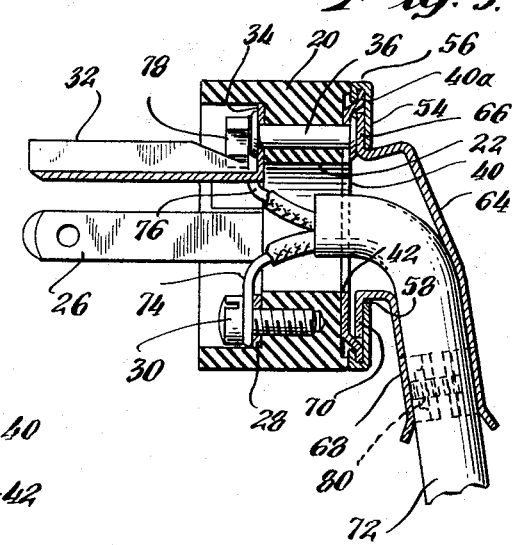
Fig. 3.
Fig. 6.
INVENTOR.
Alvin W. Fuller
BY
Wooster, Davis & Cifelli
ATTORNEYS.

Jan. 2, 1968 A. W. FULLER 3,362,006
ELECTRICAL WIRING DEVICE HAVING A RESILIENT BODY
AND ANGULARLY ADJUSTABLE ANGLED CORD GRIP
Filed April 24, 1967 2 Sheets-Sheet 2
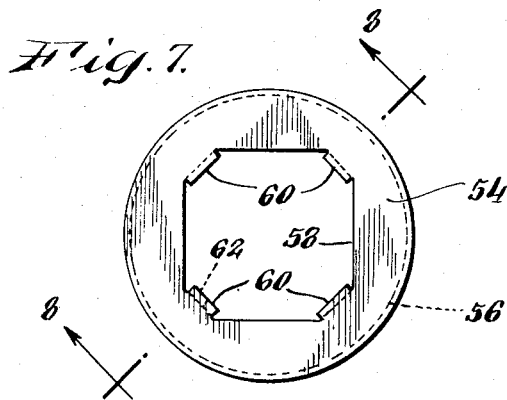
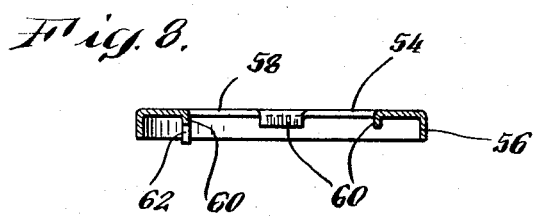
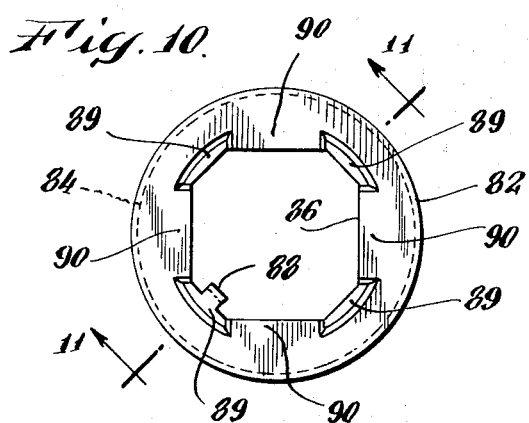
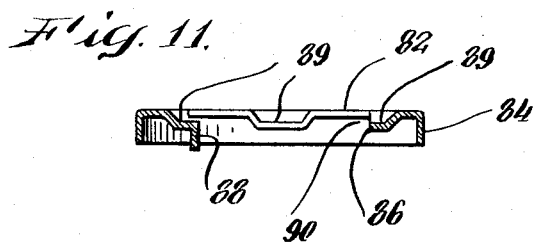
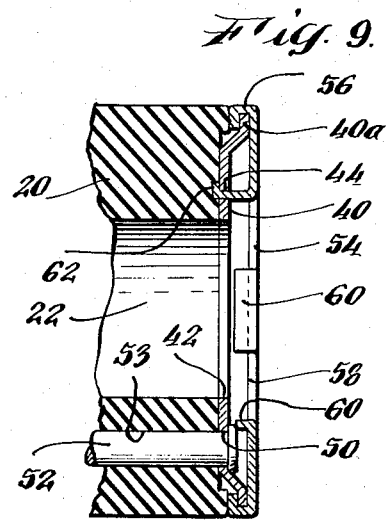
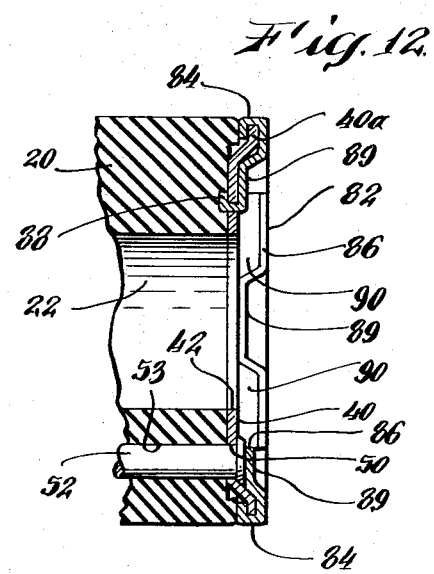
INVENTOR
Alvin W. Fuller
BY
Wooster, Davis & Cifelli
ATTORNEYS.

United States Patent Office 3,362,006
Patented Jan. 2, 1968

3,362,006
ELECTRICAL WIRING DEVICE HAVING A RESILIENT BODY AND ANGULARLY ADJUSTABLE ANGLED CORD GRIP
Alvin W. Fuller, Shelton, Conn., assignor to Harvey Hubbell, Incorporated, Bridgeport, Conn., a corporation of Connecticut
Filed Apr. 24, 1967, Ser. No. 633,283
8 Claims. (Cl. 339—14)

ABSTRACT OF THE DISCLOSURE

An electrical wiring device having a resilient body and an angularly adjustable cord grip. A metallic top plate is mounted on the end of the body and a metallic cover member is mounted on the top plate. The top plate and cover member define openings aligned with a central opening in the body and are spaced from one another. The space between the cover member and top plate defines a plurality of radial guideways which receive the feet of the cord grip.

---

This application is a continuation-in-part of my co-pending application Ser. No. 442,337 filed Mar. 24, 1965, for Electrical Wiring Device Having a Resilient Body and Angularly Adjustable Angled Cord Grip, now abandoned.

This invention relates to electrical wiring devices and, more particularly, to such devices having a resilient body construction and an angularly adjustable cord grip.

In U.S. Patent 3,137,536 of J. F. Healy, issued June 16, 1964 to applicant's assignee, there is disclosed and claimed an electrical wiring device having a right angle cord grip adapted to be positioned selectively for different angular directions of cord take-off. The patent illustrates an attachment plug cap having an insulation body member enclosed in a metallic outer shell. The end walls of the shell and body member cooperate to form a plurality of radial channels for selectively receiving the feet of the clamping members of the cord grip.

The advantages of the patented construction are many, inasmuch as the angular direction of take-off of the cord grip may be selectively positioned in usage, when the cap is mounted in an electrical wall outlet, to allow cord entrance to the cap from the top, bottom, left, or right, whichever is most convenient. This permits use of the cap in restricted quarters, regardless of the position of the electrical outlet, and eliminates bending the cord severely or damaging it by squeezing it behind equipment or furniture.

It would often be desirable to employ angularly adjustable cord grips in combination with wiring devices of the resilient body type. As used herein, the term "resilient body" is intended to refer to wiring devices which have a body made of non-rigid material and no outer metallic shell. Bodies of this type are commonly formed from a resilient electrical insulating material, such as rubber, neoprene, or a similar material. However, certain conditions have hitherto prevented adjustable cord grips from being utilized with such devices. These conditions arise from the fact that the metallic shell performs certain necessary functions in combination with the wiring device and the cord grip. First, the outer shell provides mechanical support, as the metallic shell extends around the side of the device and serves to "grasp" the body and thus aids in withdrawing it from an outlet. Second, the outer shell extends to the front edge of a connector cap and, therefore, the grounding contact of a three-contact grounding cap is easily connected to it, to thereby ground the cord grip. Third, the metallic shell is non-rotatably fixed to the body of this device, and, therefore, the four take-off directions of the cord grip are also fixed relative to the contacts. Fourth, the upper surface of the metal shell cooperates with the body member to define channels for receiving the feet of the cord grip clamping members. Elimination of the outer metallic shell to form a resilient connector body eliminates all the foregoing functions which it would be desirable to retain.

Accordingly, it is the primary object of the present invention to provide an improved wiring device having a resilient body and a selectively angularly adjustable cord grip. Other objects are to provide such a wiring device wherein: the cord grip may be secured to the body member; the cord grip may be electrically connected to the grounding contact of the grounding connector cap; the take-off directions of the cord grip are fixed relative to the body member; and guideways are formed for receiving the feet of the cord grip clamping members. Other objects, features, and advantages will be apparent from the following description, the appended claims, and the figures of the attached drawing, wherein:

FIG. 1 is a front view of an electrical wall outlet adapted to receive a grounding attachment plug cap, including one made in accordance with this invention;

FIG. 2 is an elevational view of the cap looking toward its contact side;

FIG. 3 is a sectional view taken substantially along the line 3—3 of FIG. 2;

FIG. 4 is a sectional view taken substantially along the line 4—4 of FIG. 2;

FIG. 5 is a plan view of the top plate employed in the cap of this invention;

FIG. 6 is a cross sectional view taken substantially along the line 6—6 of FIG. 5;

FIG. 7 is a plan view of a cover member employed in the cap of this invention shown in its condition prior to its final assembly;

FIG. 8 is a cross sectional view taken substantially along the line 8—8 of FIG. 7;

FIG. 9 is an enlarged cross sectional view illustrating the top plate of FIG. 5 and the cover member of FIG. 7 mounted on the resilient body member of a cap embodying the invention;

FIG. 10 is a view similar to FIG. 7 illustrating a modified version of a cover member in accordance with this invention;

FIG. 11 is a cross section taken substantially along the line 11—11 of FIG. 10; and FIG. 12 is an enlarged cross sectional view illustrating the top plate of FIG. 5 and the cover member of FIG. 10 mounted on the resilient body member of a cap embodying the invention.

With more particular reference to the drawings, there is illustrated in FIG. 1 a grounding electrical wall outlet comprising a wall plate 10 having an opening 12 in which is located the boss 14 of a usual grounding wall outlet. The boss is provided with parallel aligned inlet slots 16 leading to internal female contacts (not shown) in the power supply circuit of the wiring system, and an intermediate grounding opening 18 leading to an internal grounding female contact in the outlet, all in accordance with a standard grounding outlet construction.

An attachment plug cap for use in the illustrated outlet and including the improved construction of this invention is shown in FIGS. 2–9. It is, however, to be understood that, although the cord take-off is shown as applied to a cap, it may also be utilized with other electrical wiring devices where it is found to be adaptable.

The cap shown comprises a resilient body member 20 made of a suitable molded insulating material, such as natural or synthetic rubber or the like. The body member 20 is substantially cylindrical in shape and includes an outer exposed cylindrical side wall, two generally flat end walls, and a central passageway 22 extending axially therethrough. Mounted on the inner end of the body member by any suitable means such as, for example, the rivets 24, are a pair of parallel power blade contacts 26 projecting from the end of the body member in position for insertion into the slots 16 of the outlet. These contacts extend from their base plates 28 positioned in suitable recesses in one end wall of the body member 20. The rivets 24 are mounted, as by being molded, in the material of the body member 20, are rigidly secured to the base plates 28, and extend partially through the body member. The base plates 28 are provided with means for securing conductor wires to them such as, for example, the binding screws 30. Also mounted in a recess in the one end wall of the body member is a grounding contact pin 32 projecting from the end of the body member and shaped to enter the opening 18 of the outlet to engage a female grounding contact therein. In the illustrated embodiment of the invention, the grounding contact pin 32 is essentially U-shaped and the opening 18 is shaped to accommodate it.

The grounding contact pin 32 extends from a grounding base plate 34 secured in its recess by a rivet 36 (FIG. 3) and a tubular, internally threaded, rivet 38 (FIG. 4). Both these latter rivets extend completely through the body member 20 and are flanged-over to retain the body member, grounding base plate and top plate assembled.

The other end wall of the body member 20 has mounted on its surface and secured by a plurality of rivets, including the rivets 36, 38, a top plate 40. Top plate 40, shown by itself in FIGS. 5 and 6, is circular and disk-like having an upwardly displaced, outwardly extending annular rim 40a. The top plate 40 defines a central opening 42 that is aligned with the passageway 22 in the body member 20 when assembled thereto. Top plate 40 also defines a slot 44 displaced from the central opening 42, and positioning holes 46, 48 for receiving the rivets 36, 38, respectively. Top plate 40 also includes a hole 50 which receives one end of a securing rivet 52 that extends through opening 53 in the body member 20 from end wall to end wall thereof and is positioned, as illustrated in FIG. 2, so as to be out of contact with any current carrying elements. Rivets 24 do not contact top plate 40.

Mounted to and on top of plate 40 is a cover member 54 which is secured to the top plate to form an integral structural and functional unit therewith. The cover member 54 is illustrated by itself in FIGS. 7 and 8 as it appears before assembly to the top plate. From these views, it will be noted that the cover member 54 is circular, disk-like, and includes a downwardly extending peripheral rim 56. The cover member 54 defines a central opening 58 which is substantially square, with the exception of the corners. Those portions of cover member 54 at the corners of the opening are formed to provide four downwardly projecting wall portions 60, one of which includes a more elongated tab 62.

In the assembled cap of the invention, the top plate 40 is assembled to one end wall of the body member 20 first. The rigidly secured rivets 36, 38 extend through the body member 20 from their corresponding positioning holes 46, 48 in top plate 40 to matching openings in grounding base plate 34. Ridgdly secured rivet 52 extends through the body member from positioning hole 50 to a recess formed in an end wall of body member 20. The cover member 54 is then mounted on and to top plate 40 with the tab 62 inserted through the slot 44 to position these parts. The outer rim 56 of the cover member is crimped around the edge of rim 40a, as is most clearly shown in FIG. 9. The resilience of body member 20 permits the crimping to be effected. It will now be noted that the presence of the wall portions 60 define radial guide channels therebetween and intermediate the spaced portions of top plate 40 and cover member 54.

An angled cord grip including an upper clamping member 64 having a laterally extending foot 66, and a lower clamping member 68 having a laterally extending foot 70, is then positioned with the feet in any pair of aligned guide channels formed between the top plate 40 and cover member 54 by wall portions 60. It will thus be seen that the cord opening between the clamping members may be pointed in any of four directions—up, down, left, or right—with respect to FIG. 1. An electrical cord 72 is passed through the clamping members and the two current carrying conductor wires 74 are connected to the binding screws 30. The grounding conductor wire 76 is secured to the grounding base plate 34 by means of a grounding binding screw 78 which is threadedly mounted in the internally threaded tubular rivet 38. The clamping members are then caused to grip the cord 72 by tightening the cord grip screws 80.

FIGS. 10–12 illustrate a modification of the invention wherein a somewhat different form of cover member 82 is employed in connection with top plate 40. Cover member 82 includes a downwardly extending peripheral rim 84 and defines a substantially square central opening 86. A tab 88 extends from one corner of the square opening. In addition, at each corner of the square central opening, the member 82 is formed with an offset, depressed portion 89 so that channels 90 are created therebetween and intermediate the top plate and cover member when they are joined as previously described.

It will now be seen that all the objectives set forth above have been achieved by the novel wiring device of this invention. Although the body member of the cap does not have a metallic shell, the mechanical and electrical advantages of such a shell have been retained in the present construction. It will also be apparent to those skilled in the art that certain variations and modifications may be made in the illustrated embodiment of this invention without departing from its true spirit and scope. Accordingly, the foregoing description is to be construed as illustrative only rather than limiting. This invention is limited only by the scope of the following claims.

What I claim as new and desire to secure by Letters Patent of the United States is:

1. An electric wiring device which comprises: a body member of electrically insulating material having first and second spaced ends and an outer side wall therebetween and defining a central passageway between said first and second ends; electrical contacts mounted on one end of said body member; means for connecting the wires of an insulated conductor cord to said contacts; a metallic plate member mounted on the other end of said body member and secured to said body member by fastening means extending into said body member, said plate member defining a first central opening aligned with said passageway; a metallic cover member fixedly secured to said plate member, said cover member defining a second central opening aligned with said first central opening, and a plurality of guideways extending radially outward from said second central opening and intermediate said plate and cover members; a cord grip including clamping members with feet and clamping portions in substantially parallel planes, said feet adapted for mounting in any of said guideways to locate the clamping portions in different angular positions about said first and second openings and said passageway; and means for clamping the clamping portions on a cord extending through the openings and passageway to the connecting means.

2. The wiring device of claim 1 wherein said cover member includes a plurality of circumferentially spaced tabs extending toward said plate member to define said guideways therebetween.

3. The wiring device of claim 2 wherein the outer surface of said cover member is substantially planar.

4. The wiring device of claim 1 wherein one of said contacts is a grounding contact and said fastening means electrically connects said grounding contact to said plate member.

5. The wiring device of claim 1 wherein said plate member defines a slot therethrough and said cover member includes a tab extending through said slot to orient said members properly.

6. The wiring device of claim 1 wherein one of said contacts is a grounding contact; said fastening means comprises an internally threaded tubular rivet that is secured to said grounding contact and said plate member; and a binding screw is threadedly mounted in said rivet.

7. An electric wiring device which comprises: a body member of electrically insulating material having first and second spaced ends and an outer side wall therebetween and defining a central passageway between said first and second ends; electrical contacts mounted at said first end, one of said contacts being a grounding contact; a metallic disk-like plate member mounted at said second end defining a first central opening aligned with said passageway and a slot displaced from said first opening, and including an upstanding annular outer rim; an internally threaded tubular rivet securing said plate member to said body member and making an electrical connection between said plate member and said grounding contact; binding screw means threaded into said rivet adjacent said grounding contact for connecting a ground wire; means for connecting the wires of an insulated conductor cord to the remaining contacts; a metallic disk-like cover member having an outer rim crimped over the rim of said plate member and a tab extending through said slot to orient the members properly, said cover member defining a second central opening aligned with said first central opening and a plurality of guideways extending radially outward from said second central opening and intermediate said plate and cover members; a cord grip including clamping members having clamping portions and feet in substantially parallel planes, said feet adapted for mounting in any of said guideways to locate the clamping portions in different angular positions about said first and second openings and said passageway; and means for clamping the clamping portions on a cord extending through the openings and passageway to the contact connecting means and said binding screw means.

8. An electric wiring device which comprises: a body member of electrically insulating material having first and second spaced ends and an outer sidewall therebetween and defining a central passageway between said first and second ends; electrical contacts mounted on one end of said body member; means for connecting the wires of an insulated conductor cord to said contacts; a disk-like metallic plate member having an upstanding annular outer rim mounted on the other end of said body member and secured to said body member by fastening means extending into said body member, said plate member defining a first central opening aligned with said passageway; a disk-like metallic cover member having an annular outer rim crimped over the rim of said plate member, said cover member defining a second central opening aligned with said first central opening, and a plurality of guideways extending radially outward from said second central opening and intermediate said plate and cover members; a cord grip including clamping members with feet and clamping portions in substantially parallel planes, said feet adapted for mounting in any of said guideways to locate the clamping portions in different angular positions about said first and second openings and said passageway; and means for clamping the clamping portions on a cord extending through the openings and passageway to the connecting means.

References Cited

UNITED STATES PATENTS

| | | | |
|---|---|---|---|
| 2,033,960 | 3/1936 | Tiffany | 339—62 |
| 2,326,181 | 8/1943 | Sundquist et al. | |
| 2,869,102 | 1/1959 | Hubbell | 339—14 XR |
| 3,137,536 | 6/1964 | Healy. | |
| 3,233,205 | 1/1966 | Sundquist | 339—62 |

MARVIN A. CHAMPION, *Primary Examiner.*

PATRICK A. CLIFFORD, *Examiner.*